(12) United States Patent
Brandt et al.

(10) Patent No.: US 10,660,389 B2
(45) Date of Patent: May 26, 2020

(54) ENERGY DISSIPATING HELMET

(71) Applicants: Richard A. Brandt, New York, NY (US); Dragoslav Scepanovic, New York, NY (US)

(72) Inventors: Richard A. Brandt, New York, NY (US); Dragoslav Scepanovic, New York, NY (US)

( * ) Notice: Subject to any disclaimer, the term of this patent is extended or adjusted under 35 U.S.C. 154(b) by 258 days.

(21) Appl. No.: 15/871,335

(22) Filed: Jan. 15, 2018

(65) Prior Publication Data

US 2018/0249778 A1    Sep. 6, 2018

Related U.S. Application Data

(60) Provisional application No. 62/447,578, filed on Jan. 18, 2017.

(51) Int. Cl.
*A42B 3/06* (2006.01)
*B32B 3/18* (2006.01)
(Continued)

(52) U.S. Cl.
CPC .............. *A42B 3/064* (2013.01); *A42B 3/065* (2013.01); *A42B 3/124* (2013.01); *A42B 3/125* (2013.01); *B29C 33/0022* (2013.01); *B29C 33/0027* (2013.01); *B32B 3/18* (2013.01); *B32B 5/18* (2013.01); *B32B 9/025* (2013.01); *B32B 9/045* (2013.01); *B32B 9/046* (2013.01); *B32B 25/08* (2013.01); *B32B 25/20* (2013.01); *B32B 27/065* (2013.01); *B32B 27/08* (2013.01); *B32B 27/18* (2013.01); *B32B 27/34* (2013.01); *B32B 27/40* (2013.01); *B32B 37/185* (2013.01); *B32B 38/1866* (2013.01); *A42B 3/08* (2013.01); *B29K 2083/005* (2013.01); *B29L 2031/4821* (2013.01); *B32B 2266/0278* (2013.01); *B32B 2305/022* (2013.01); *B32B 2307/56* (2013.01);
(Continued)

(58) Field of Classification Search
CPC .. A42B 3/12; A42B 3/064; A42B 3/00; A42B 3/046; A63B 71/103
USPC .......................................................... 2/412
See application file for complete search history.

(56) References Cited

U.S. PATENT DOCUMENTS 9,089,180 B2 *  7/2015  Phipps ..................... A42B 3/12
9,388,873 B1 *  7/2016  Phipps .................... B60R 19/28
(Continued)

*Primary Examiner* — Gloria M Hale
(74) *Attorney, Agent, or Firm* — R. Neil Sudol; Henry D. Coleman

(57) ABSTRACT

A helmet has inner and outer shells separated by a plurality of interconnected relatively soft columns or posts. The columns each have a middle post or pillar section, a capital that is of larger diameter than the post, and a base also of larger transverse dimension than the post. When an impact above a design threshold occurs on the outer shell, the columns, particularly the post sections thereof, near the impact location compress and buckle, dissipating impact kinetic energy, while columns spaced from the impact zone stretch and support more of the impact force. The applied force is therefore reduced and spread out over a relatively large area, and a resultant wave created within the column manifold disperses additional heat, further reducing the force and torque applied on the outer shell and transmitted to the inner shell and onto the skull of a helmet user. A method and mold for fabricating the column manifold are also disclosed.

19 Claims, 9 Drawing Sheets

(51) Int. Cl.

| | | |
|---|---|---|
| *B32B 5/18* | (2006.01) | |
| *B32B 9/02* | (2006.01) | |
| *B32B 9/04* | (2006.01) | |
| *B32B 25/08* | (2006.01) | |
| *B32B 25/20* | (2006.01) | |
| *B32B 27/08* | (2006.01) | |
| *B32B 27/06* | (2006.01) | |
| *B32B 27/18* | (2006.01) | |
| *B32B 27/40* | (2006.01) | |
| *B32B 27/34* | (2006.01) | |
| *B32B 37/18* | (2006.01) | |
| *B32B 38/18* | (2006.01) | |
| *B29C 33/00* | (2006.01) | |
| *A42B 3/12* | (2006.01) | |
| *B29L 31/48* | (2006.01) | |
| *A42B 3/08* | (2006.01) | |
| *B29K 83/00* | (2006.01) | |

(52) U.S. Cl.
CPC ....... *B32B 2317/08* (2013.01); *B32B 2319/00* (2013.01); *B32B 2375/00* (2013.01); *B32B 2377/00* (2013.01); *B32B 2437/04* (2013.01); *B32B 2571/00* (2013.01)

(56) References Cited

U.S. PATENT DOCUMENTS

| | | | | |
|---|---|---|---|---|
| 9,879,741 B2* | 1/2018 | Phipps | .................... | B60R 19/28 |
| 2012/0175206 A1* | 7/2012 | Kanous | ................ | A47C 27/18 |
| | | | | 188/377 |
| 2012/0297526 A1* | 11/2012 | Leon | ...................... | A42B 3/12 |
| | | | | 2/413 |
| 2013/0185837 A1* | 7/2013 | Phipps | .................... | A42B 3/12 |
| | | | | 2/2.5 |
| 2014/0007322 A1* | 1/2014 | Marz | ..................... | A42B 3/065 |
| | | | | 2/411 |
| 2014/0208486 A1* | 7/2014 | Krueger | ................ | A42B 3/064 |
| | | | | 2/414 |
| 2015/0128335 A1* | 5/2015 | Dehni | .................... | A41D 13/06 |
| | | | | 2/459 |
| 2015/0223547 A1* | 8/2015 | Wibby | ................... | A42B 3/125 |
| | | | | 2/414 |
| 2016/0165993 A1* | 6/2016 | Knight | .................. | A42B 3/064 |
| | | | | 2/411 |
| 2016/0255900 A1* | 9/2016 | Browd | .................. | A42B 3/064 |
| 2016/0262483 A1* | 9/2016 | Cheng | ..................... | A42B 3/04 |
| 2017/0188648 A1* | 7/2017 | Larrabee | ................ | A42B 3/28 |
| 2017/0273387 A1* | 9/2017 | Sicking | ................. | A42B 3/064 |
| 2017/0303623 A1* | 10/2017 | Sicking | ................. | A42B 3/064 |
| 2018/0249778 A1* | 9/2018 | Brandt | .................. | A42B 3/124 |

* cited by examiner

ENERGY DISSIPATING HELMET

BACKGROUND OF THE INVENTION

The present invention is directed to helmets and to an associated method for manufacturing the helmets.

The need for more protective helmets has been well documented. The frequent concussions encountered by football players have led to serious medical issues, have been the subject of numerous articles, and have given rise to lawsuits from injured players, a decline in television viewership, and a decline in participation at the youth level. Until recently, almost all helmets consisted of an exterior hard shell with softer padding attached to the inner surface of the shell. The concussion epidemic has led to the introduction of improved helmets that replace the conventional inner padding with more energy dissipating materials and constructions, but, judging from the fact that concussions continue to frequently occur in football and other sports, there is obviously much room for improvement.

The prior art consists of the use of more energy absorbing padding (e.g., V. Bologna et al, No. 61/763,802), the use of inflated air containers to absorb some of the impact energy (e.g., C. Alexander et al., U.S. Pat. No. 6,073,271), the use of fluid cells to absorb some of the impact energy (e.g., W. Johnson, U.S. Patent Application Publication No. 2014/0000011), the use of a cushioning layer that is partially rotatable under the outer shell (e.g., J. Marzec et al, U.S. Patent Application Publication No. 2013/0000015), and the incorporation of filaments that absorb some of the impact energy by deforming (e.g., S. Browd et al, U.S. Patent Application Publication No. 2016/0255900). Laboratory evaluations of these and other attempts to address the concussion issues have, however, shown that none of these innovations provide a significant increase in player protection.

OBJECTS OF THE INVENTION

It is an object of the present invention to provide an improved helmet providing enhanced protection to users.

Another object of the invention is to provide a method for manufacturing such an improved helmet.

These and other objects of the present invention will be apparent from the drawings and descriptions herein. It is to be noted that any single embodiment of the invention may not achieve all of the objects of the invention, but that every object is attained by at least one embodiment.

SUMMARY OF THE INVENTION

The main new idea of the present helmet design is the incorporation of inner and outer relatively hard shells separated by a plurality of interconnected relatively soft suitably shaped columns. The geometry and composition of these columns is chosen such that, when a strong enough impact occurs on the outer shell, the columns near the impact location compress and buckle, causing a significant amount of the impact kinetic energy to dissipate into thermal energy, and causing the more-distant columns to stretch and support more of the impact force. This spreads the force out over a relatively large area, and the resultant wave created within the column manifold causes more of the impact kinetic energy to transfer into heat, thus reducing the force and torque applied on the outer shell and transmitted to the inner shell and onto the skull residing under the shell.

For this mechanism to be effective, the composition and dimensions of the columns must be appropriately chosen. In particular, the columns should have relatively wide capitals and bases (to spread transmitted forces over large areas) and relatively narrow central sections (to create buckling), and a relatively large capacity for heat production. (In technical terms, when a large enough force is applied, the compressive stress created within the column must exceed the ultimate stress, and the buckling threshold must be exceeded.) The inventive aspects of this helmet include the design of such columns that effectively reduce the applied and transmitted forces that arise from impacts onto the helmet, the design of molds to fabricate the column manifold, and the design of an effective helmet testing apparatus.

While the helmet of the present invention is particularly useful as a football helmet, it is to be understood that the helmet can be used in other sports, and by the riders of bicycles, motorcycles, and cars, and in the military.

A helmet in accordance with the present invention comprises an outer shell, at least one interior shell, and a plurality of columns disposed between the outer shell and the at least one interior shell. The columns are configured for deformation or collapse upon application of a force to the outer shell exceeding a predetermined maximum magnitude. Preferably, that predetermined maximum magnitude is less than a magnitude known to cause concussions or other traumatic brain injury.

Pursuant to further features of the present invention, the columns each have a longitudinal axis and at least three sections including a middle section in the form or a post or pillar having a first dimension transverse to the axis, a capital section with a second dimension transverse to the axis, and a base section with a third dimension transverse to the axis. The second dimension (of the capital) and the third dimension (of the base) are each substantially larger than the first dimension (of the middle or pillar). The capital section is disposed against or in contact with the outer shell, while the base section is disposed against or in contact with the at least one interior shell.

The columns are typically each oriented substantially perpendicularly to the outer shell and the at least one interior shell. The columns are also typically connected or attached to the outer shell and the one interior shell.

Pursuant to another feature of the present invention, the base sections of at least some of the columns are each unitary with the base section of at least one respective adjacent column. In other words at least some of the columns are unitary with one another at their respective base sections. In that case the unitary or interconnected columns form a matrix or manifold between the outer shell and the at least one interior shell.

In one configuration of the columnar layer, the capital section and the base section of each column include conical portions each contiguous with the middle or pillar section. As per a more detailed description of a preferred embodiment, the capital section is entirely conical, while the base section includes a cylindrical portion and a conical portion.

The third dimension is preferably larger than the second dimension. In other words, the bases of the columns are preferably larger than the capitals or crowns. For example, the capital section typically has a radius at least 3 times larger, and the base section has a radius that is at least 4.5 times larger, than a radius of the middle section, where the radii are measured in planes perpendicular to the axes of the columns.

For each column, it is contemplated that each of the three sections has a circular cross-section in planes transverse or perpendicular to the axis of the column.

Pursuant to another feature of the present invention, the at least one interior shell is one of a plurality of interior shells including an innermost interior shell. The at least one interior shell is disposed between the outer shell and the innermost interior shell. The helmet may additionally comprise a layer of resilient material between the at least one interior shell and the innermost interior shell. The resilient material is preferably sufficiently soft and flexible to provide for a comfortable fit on a user's head. Also, the resilient material is selected to contribute to impact kinetic energy dissipation. More particularly, the resilient material is a shock absorbing material such as urethane foam or sorbothane and mixtures thereof.

The innermost interior shell may be constructed using a urethane or a leather fabric. Thus, whereas the at least one interior shell is made of a substantially rigid material, the innermost interior shell is made of a resilient or soft material. The outer shell is preferably made of resiliently deformable material.

Each of the columns has central radius R, a height L, and a Young's Modulus E selected to satisfy a buckling condition whereby the columns deform and collapse upon application of a force to the outer shell exceeding the predetermined maximum magnitude. (Different columns can have different values of R, L, and E.) Assuming that the columns are long, thin, straight, and homogeneous, the buckling condition is given by the Euler expression for the minimum force F that causes buckling:

$$F = \pi^2 EI/(KL)^2 = \pi^3 R^4 E/(2KL)^2$$

where $I = \pi R^4/4$ is the minimum area moment of inertia of the column and K=0.5 for the fixed boundary condition relevant in this construction.

Pursuant to a supplemental feature of the present invention, the helmet further comprises a base layer disposed proximate to the at least one interior shell, the columns being attached to or unitary with the base layer. Such a base layer is preferably molded integrally with the columns. The base layer may be one of a plurality of separate base layers, in which case the columnar layer is constructed as a set of columnar manifolds or matrices respectively attached via the base layers to an outer surface of the at least one interior shell. The capitals of the columns are attached separately to an inner surface of the outer shell. In this embodiment, the columns are attached in sections to the outer shell and the at least one interior shell, each section having a respective base layer to which a plurality of the columns are attached.

In an alternative design, the columns are attached separately from one another to the outer shell and the at least one interior shell. In any event the columns are each attached at one end to the at least one interior shell and at an opposite end to the outer shell.

The outer shell is preferably strong and deformable enough to absorb impact energy without rupturing. This functionality may be accomplished by devising the outer shell to include multiple layers of Kevlar.

The at least one interior shell may be made at least in part of fiber reinforced plastic.

In a preferred configuration of the columnar layer, each column of a subset of the columns is surrounded by six others of the columns. (The columns along an outer periphery or edge of the columnar layer are each surrounded by fewer than six other columns.)

It is contemplated that the material properties of the columns such as their dimensions and material compositions are chosen to maximize the heat produced when the columns compress and buckle. One acceptable material is silicone rubber.

Pursuant to a specific embodiment of the invention, one or more of the columns each include a first part and a separate second part joined to one another. The first part consists of a capital and an attached shaft, while the second part consists of a base with a central vertical hole or channel that accommodates or receives the attached shaft of the first part.

A method for manufacturing a helmet comprises, in accordance with the present invention, providing an outer shell and further providing at least one interior shell. The method also comprises molding a plurality of deformable or collapsible columns, disposing the columns between the outer shell and the at least one interior shell so that the columns are each oriented substantially perpendicularly to the outer shell and the at least one interior shell, and attaching the columns to the outer shell and the at least one interior shell. The columns are configured for deformation or collapse upon application of a force to the outer shell exceeding a predetermined maximum magnitude.

In accordance with a further aspect of the invention, the molding of the columns includes molding at least one subset of the columns together in a mold having a mold base, thereby forming a manifold or matrix of columns in the subset. The manifold or matrix has a molded base with which the columns of the at least one subset of the columns are unitary. Then the attaching of the columns to the at least one interior shell includes attaching the molded base to the at least one interior shell.

The molded base may be a flat base or a concave spherical base whose curvature matches a curvature of the at least one interior shell.

A particular manufacture method comprises molding, for at least one of the columns, a first part and a separate second part, the first part consisting of a capital and an attached shaft, the second part consisting of a base with a hole or channel. The method then further comprises inserting the attached shaft into the hole or channel to thereby join the first part to the second part.

The molding is typically injection molding.

DETAILED DESCRIPTION

Figure 15:
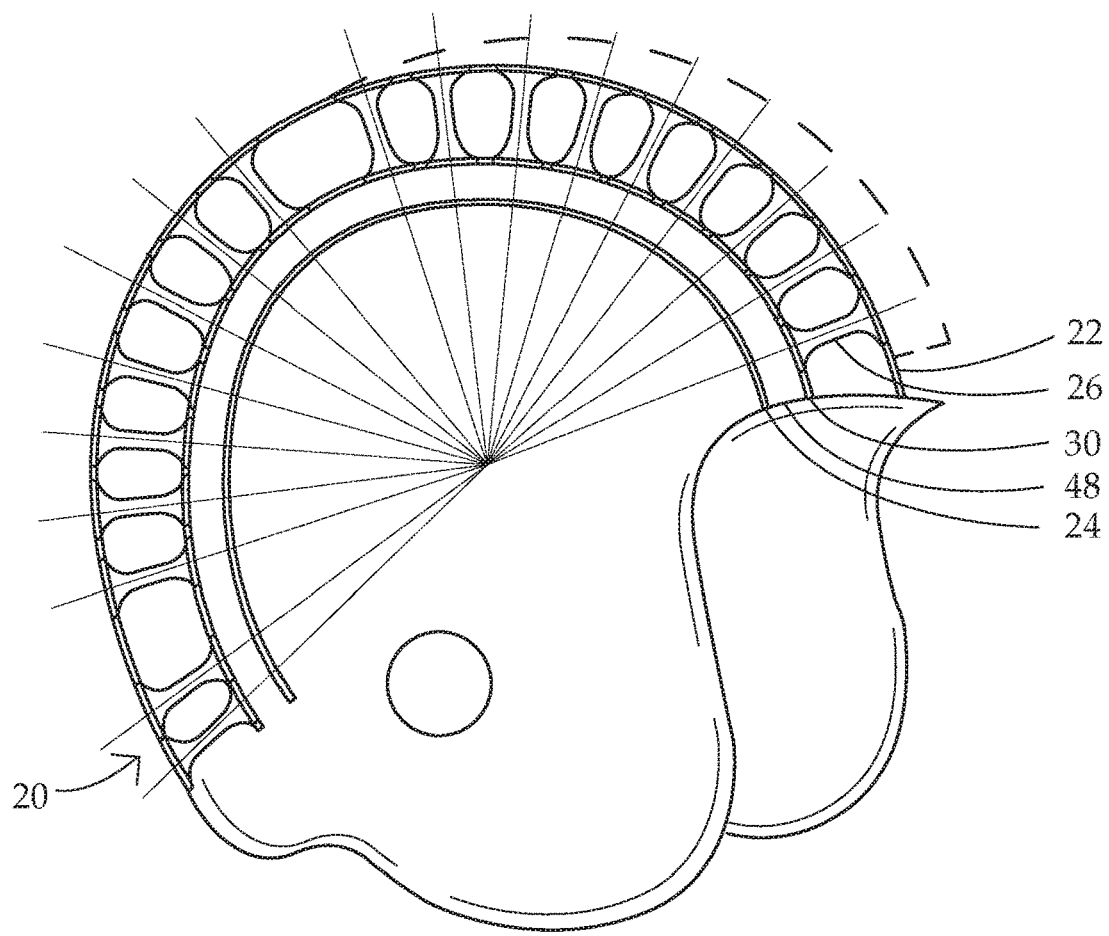
FIG. 15 is a schematic front and right side perspective view, partially in cross-section, of a helmet in accordance with the present invention.
Figure 16:
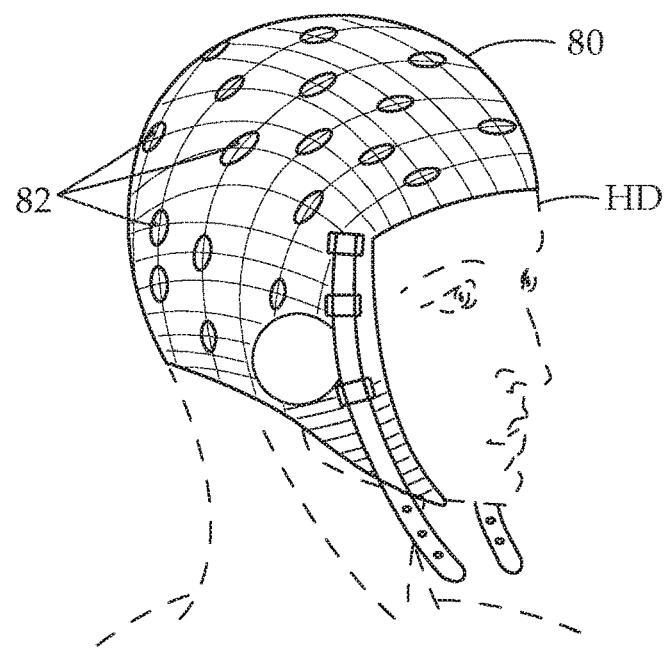
FIG. 16 is a schematic perspective view of a lining for a helmet in accordance with the present invention.

A helmet 20 (see FIGS. 14 and 15) incorporates a relatively hard outer shell 22 that can withstand the impacts that are applied on it, and a relatively soft inner layer or shell 24 that fits comfortably onto the head HD of a user (FIG. 16). Between the hard outer layer or shell 22 and the soft innermost interior layer of shell 24 resides an impact-absorbing layer 26 in the form of a plurality of Doric-like columns 28 that are attached to the outer shell 22 and to a central interior shell 30.

Figure 1:
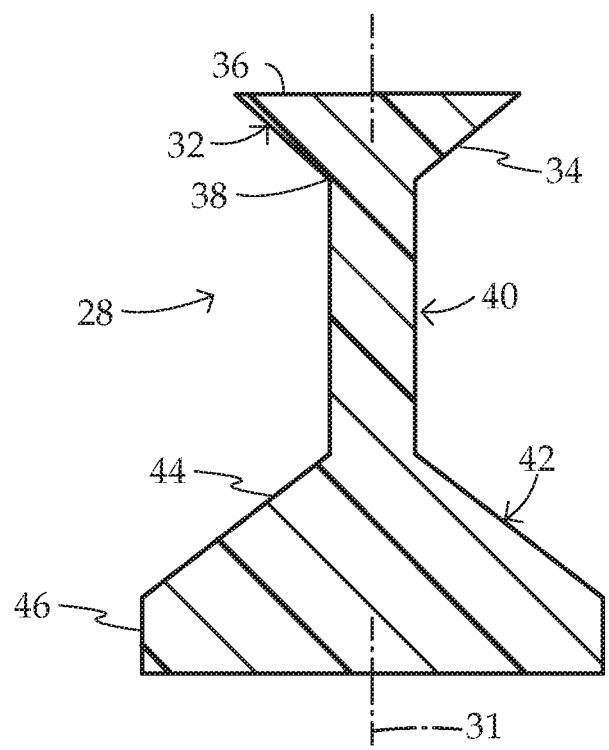
FIG. 1 is a schematic longitudinal cross-sectional view of a column in an impact-absorbing layer of a helmet in accordance with the present invention.

A preferred cross-section of such a (preferable axially symmetric) column 28 is shown in FIG. 1. The column 28 has a longitudinal axis 31 and includes three sections, namely, an upper section or capital 32, a cylindrical middle shaft or post section 40, and a lower section or base 42. Upper section or capital 32 has a conically tapered outer surface 34 bounded by a wide top or upper end 36 and a narrow bottom or lower end 38. Base section 42 has a conical outer surface 44 and a cylindrical outer surface 46, conical surface 44 being contiguous on one side with shaft or post 40 and on an opposite side with cylindrical surface 46. Cylindrical surface 46 has diameter that is preferably larger than the diameter of upper end 36 of column capital 32.

The columns are typically each oriented substantially perpendicularly to the outer shell and the at least one interior shell. The columns are also typically connected or attached to the outer shell and the one interior shell.

Preferred dimensions and materials for column 28 are discussed below with reference to FIG. 5.

Column 28 is designed to serve the following purposes.

1. The wide top or upper end 36 of capital section 32 directs the local applied force onto the narrow central shaft or post section 40.

Figure 2:
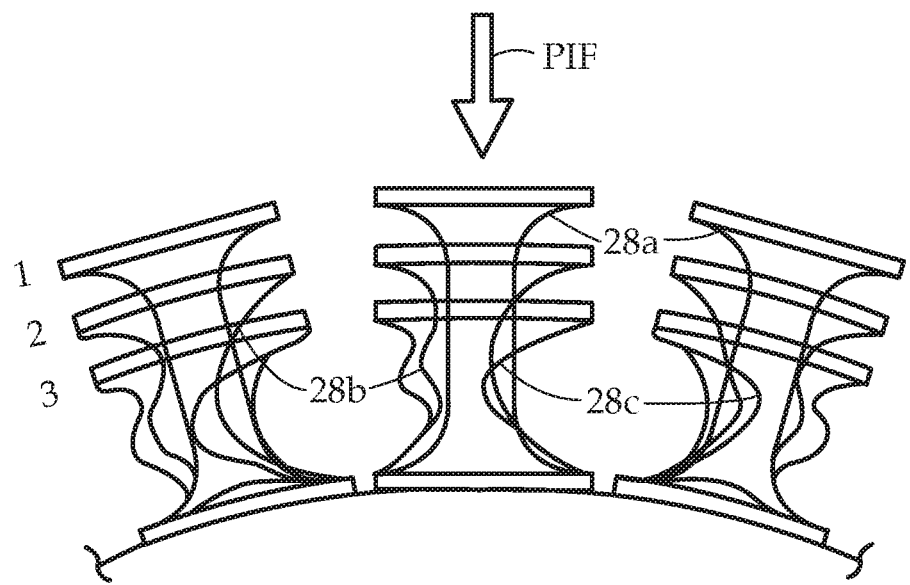
FIG. 2 is a diagram of three columns in an impact-absorbing layer of a helmet in accordance with the present invention, showing successive stages of column deformation in response to a perpendicular impact.
Figure 3:
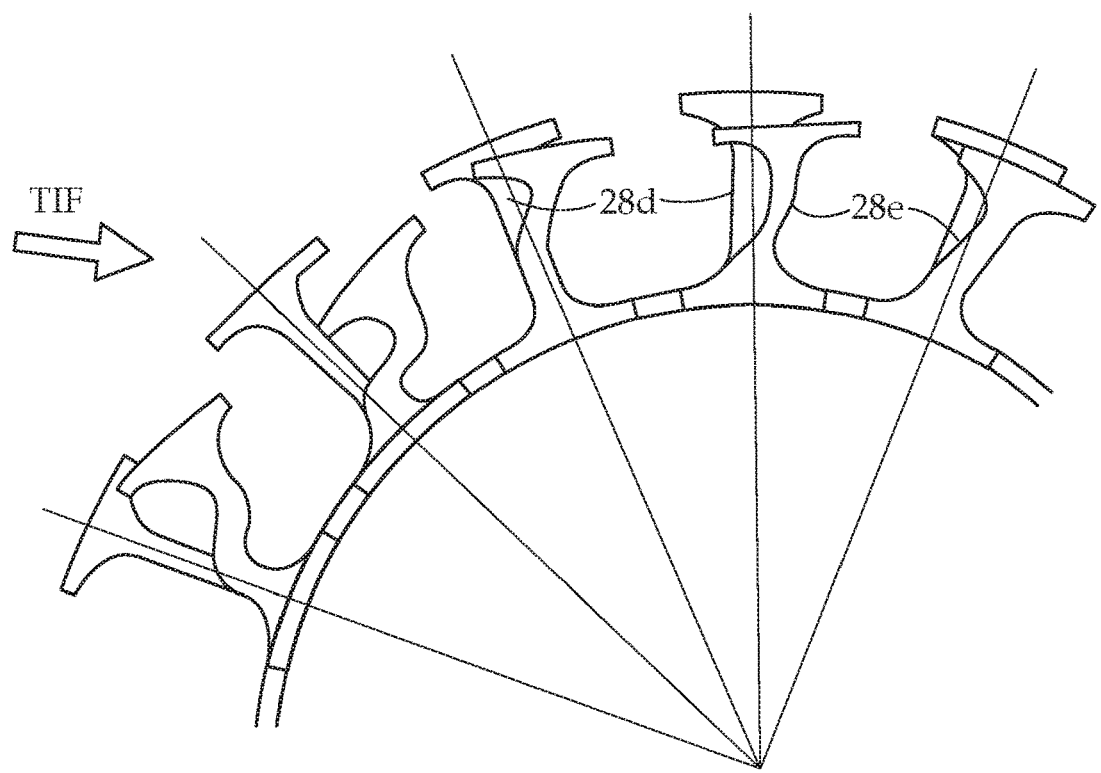
FIG. 3 is a diagram of five columns in an impact-absorbing layer of a helmet in accordance with the present invention, showing successive stages of column deformation in response to a tangential impact.

2. The central shaft or post section 40 is designed to buckle when an impact capable of causing a concussion (or other traumatic brain injury) is applied on the outer shell 22. This buckling will disperse a part of the impact kinetic energy into heat, thus reducing the magnitude of the force applied by the impact. It will also cause the adjacent columns 28 to support more of the applied force, thus spreading the impact out over a wider area. Three stages 28a, 28b, 28c of a typical buckling progression is shown in FIG. 2 for a perpendicular impact force PIF. Two stages 28d and 28e are shown in FIG. 3 for a tangential impact force TIF.

3. The buckling of all of the columns 28 in a neighborhood of an impact, to various degrees depending on the column locations relative to the impact location, will give rise to an outward moving wavelike motion that further disperses the impact energy.

4. The torque created by a tangential impact TIF on the helmet 20 will cause the outer shell 22 to rotate with the attached columns 28 relative to the central interior shell 30, thus diminishing the torque applied to that interior shell. In other words, columns 28 create an effective separation between outer shell 22 and central interior shell 30 that enables the two shells to move somewhat independently. This is also illustrated in FIG. 3.

5. The separations between, or spacing of, the columns 28 will allow for an efficient dissipation of the heat produced by the compression and buckling of the columns.

6. The wide cylindrical bottom 46 of the base section 42 further spreads out the applied force directed towards the head HD (FIG. 16) of the user.

Columns 28 are characterized by dimensions of overall height L, central radius D/2, capital radius D/2 and height A1, base radius B/2 and height A3+A4 (see FIG. 5) and material properties (density, Young's Modulus, hardness, thermal conductivity, specific heat, etc.). These properties are chosen such that the central column shaft or post sections 40 buckle when a force/acceleration PIF or TIF applied to the outer shell 22 exceeds a specified threshold (buckling condition). The buckling should occur when the magnitude of the applied force/acceleration PIF, TIF is less than the value known to cause concussions or other traumatic brain injuries.

Peak head accelerations of about 100 g are believed to be necessary to cause concussions, the precise threshold depending on the location and nature of the impact. A better indicator of the concussion threshold is believed to be the Gadd Severity Index $$SI = \int_0^{t0} a(t)^p dt$$

where p=2.5 and a(t) is the impact acceleration, in units of the acceleration of gravity g, at elapsed time t during the impact (0<t<t0=impact duration). SI values of about 450 s are believed necessary to cause concussions.

For a column of radius R, height L, and Young's Modulus E, using standard beam-bending theory, Euhler (1757) derived the expression $$F=\pi^2 E \cdot I/(K \cdot L)^2 = \pi^3 R^4 \cdot E/(2K \cdot L)^2$$

for the minimum force F that causes the column to buckle, where $I=\pi R^4/4$ is the minimum area moment of inertia of the column, and K is the effective length factor, equal to 0.5 for the fixed boundary conditions relevant here. In terms of this value, which is generally a good approximation, the properties (E, R, L) of columns 28 are selected so that F is less than a concussion causing force.

In order to maximize the kinetic energy reducing heat production arising from the compression and buckling of columns 28, the thermal production properties of the material used should be optimal. In particular, the heat capacity and thermal conductivity of the material should be as large as practically consistent with the above buckling condition. In addition, the surface area should be as large as possible given the geometrical constraints, and the impact duration associated with the material should be as large as possible given the constraints on the maximum acceleration and SI.

As indicated above, helmet 20 preferably contains three curved shells, namely, outer shell 22, innermost interior shell 24, and central interior shell 30. Layer 26 of columns 28 is disposed between outer shell 22 and central or middle shell 30, while a layer 48 (FIG. 14) of relatively soft energy absorbent material is positioned between central interior shell 30 and innermost interior shell 24. While columns 28 are shown in the appended drawing figures as identical, using columns of different dimensions at different locations is a useful option.

Figure 4:
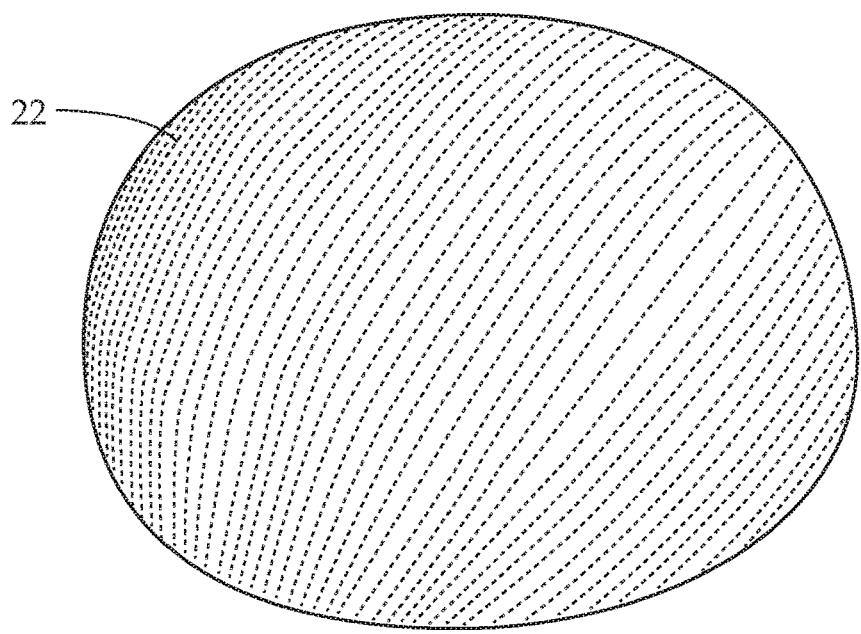
FIG. 4 is a top perspective view of part of an outer shell of a helmet on a mold in accordance with the present invention.

Outer helmet shell 22 is a first line of defense against an impact force PIF or TIF. Accordingly, shell 22 must therefore be sufficiently hard to prevent damage or penetration by an impacting body. Shell 22 should, however, not be overly rigid. Shell 22 should compress somewhat upon being struck in order to dissipate some of the impact kinetic energy. A preferred embodiment of outer shell 22 is constructed using several layers of synthetic aramid fiber material marked under the trademark Kevlar. An example of shell 22 on a created mold is shown in FIG. 4. Other viable materials include suitably laid-up carbon fiber and fiberglass. The use of other possible materials will be obvious to people skilled in the art.

It is not desirable for central interior shell 30 to be compressible because any inward movement would reduce desired compression and buckling of columns 28. Preferred materials for shell 30 are fiber reinforced plastic and polymer-impregnated fiberglass, but, because energy dissipation is not a priority here, there are many other suitably stiff possibilities that will be obvious to people skilled in the art.

Innermost interior shell 24 should be flexible so that it can conform to, and fit comfortably on, the head HD of a user. Possibilities include urethane fabrics and even conventional leather products, but there are many other suitably soft possibilities that will be obvious to people skilled in the art.

Figure 5:
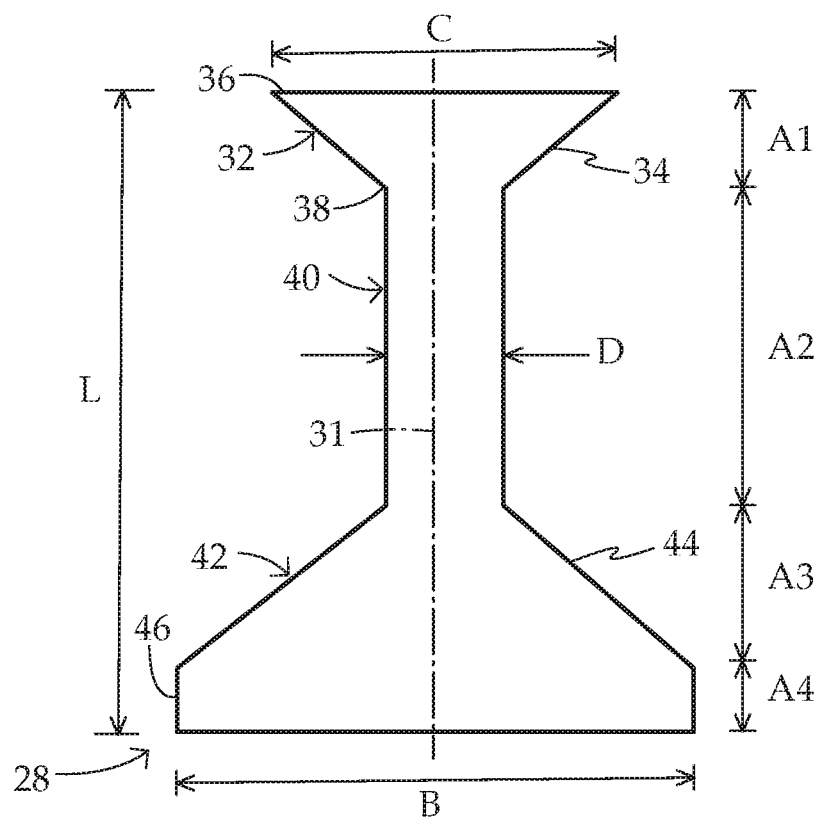
FIG. 5 is a schematic side elevational view of the column of FIG. 1, with dimension designations.

The size and shape of columns 28 are determined by specifying seven dimensions defined in the view shown in FIG. 5. This specification is ideally coordinated with the specification of the column material in order to optimize the energy transmission properties of the columns 28. In terms of the total column height L=A1+A2+A3+A4, approximate values of preferred dimension ratios are given in the following table. (Other possible ratios will be obvious to people skilled in the art.)

| C/H | D/H | B/H | A1/H | A2/H | A3/H | A4/H |
|---|---|---|---|---|---|---|
| 0.6 | 0.2 | 0.9 | 0.2 | 0.4 | 0.3 | 0.1 |

Figure 6:
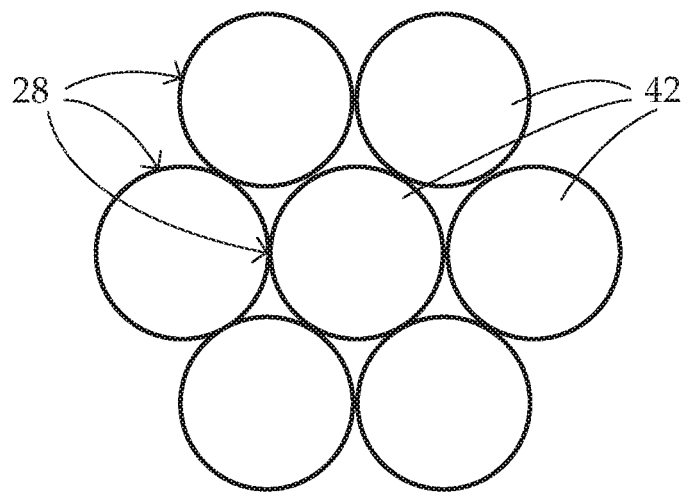
FIG. 6 is a lower plan view of seven adjacent columns in an impact-absorbing layer of a helmet in accordance with the present invention.
Figure 8:
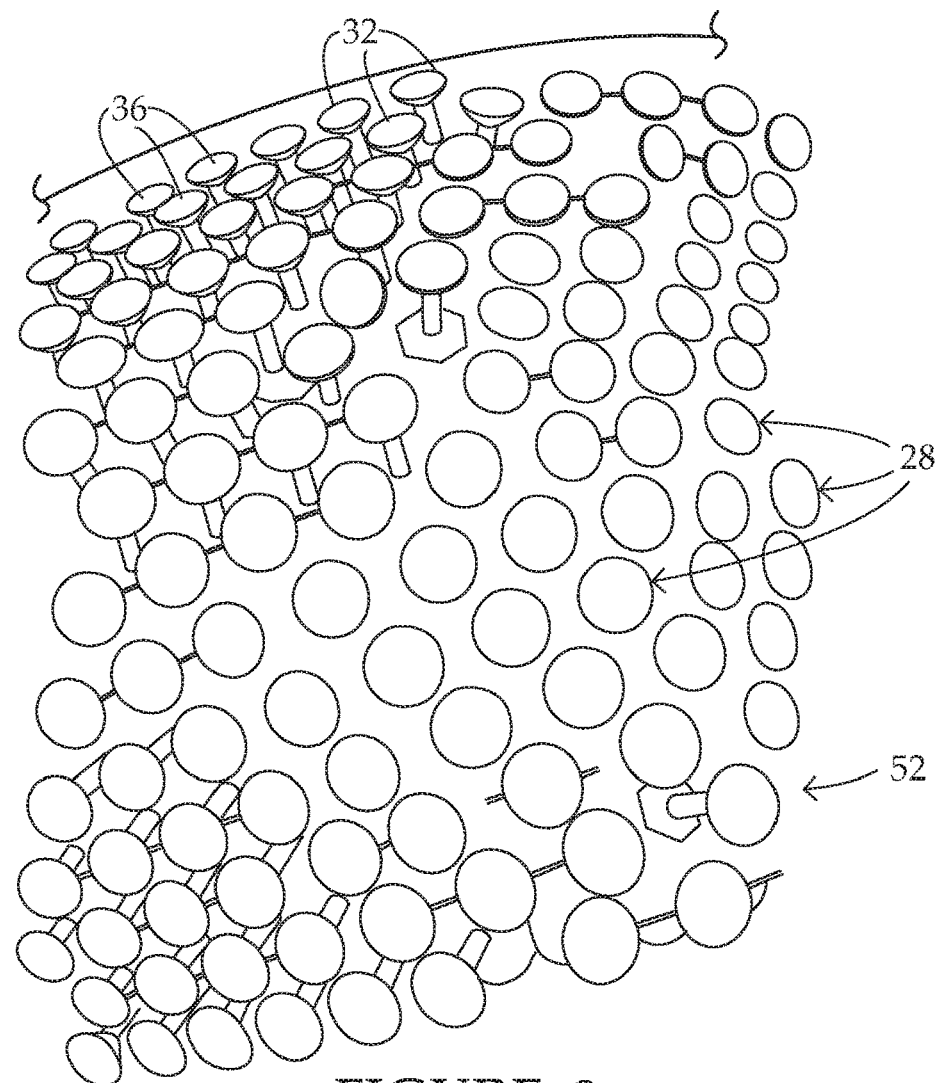
FIG. 8 is a partial perspective view of a matrix or manifold for inclusion in an impact-absorbing layer of a helmet in accordance with the present invention.
Figure 9:
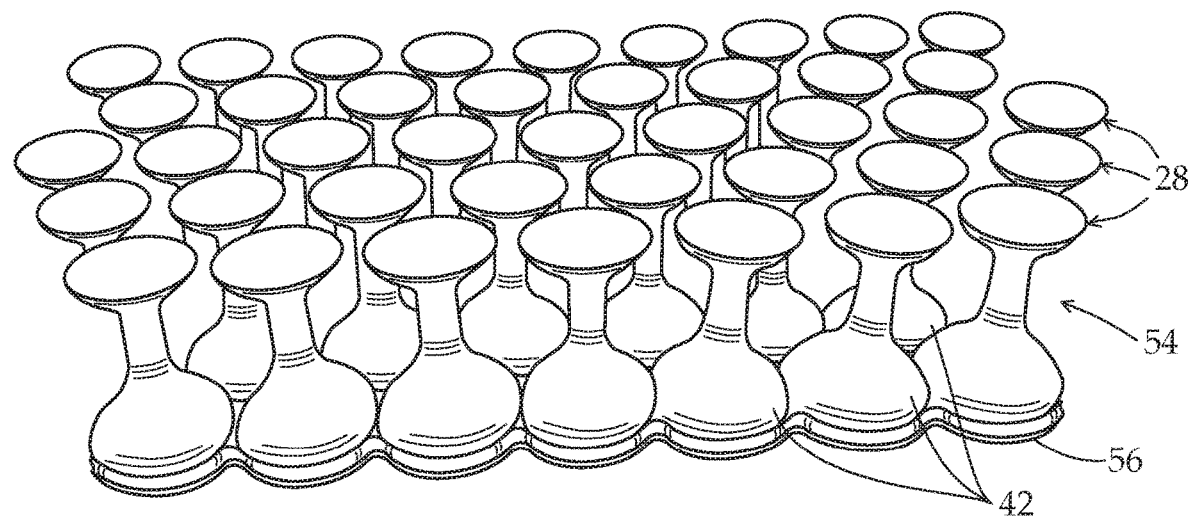
FIG. 9 is another partial perspective view of a matrix or manifold for incorporation in an impact-absorbing layer of a helmet in accordance with the present invention.

Columns 28 in helmet 20 are preferably arranged in one or more manifolds or matrices 52 (FIG. 8) or 54 (FIG. 9). In a preferred embodiment, before placement of the columns 28 onto the curved central interior shell 30, a manifold 52 consists of a curved lower thin sheet 56 (see FIGS. 9 and 10) of appropriate length and width. This base sheet 56 preferably has an inherent curvature matching the curvature of central interior shell 30. The bottoms of the column base sections 42 are attached to this base sheet 56. (Base sheet 56 and columns 28 can be fabricated in the same mold as discussed hereinafter with reference to FIGS. 11 and 17.). Column base sections 42 may be each attached to the base sections of each of the neighboring columns 28 or alternatively may be separated from them by relatively small distances. A preferred arrangement shown in FIG. 6 has each base section 42 (except for those at the boundary of the sheet) surrounded by six adjacent (or closely spaced) base sections.

Figure 7:
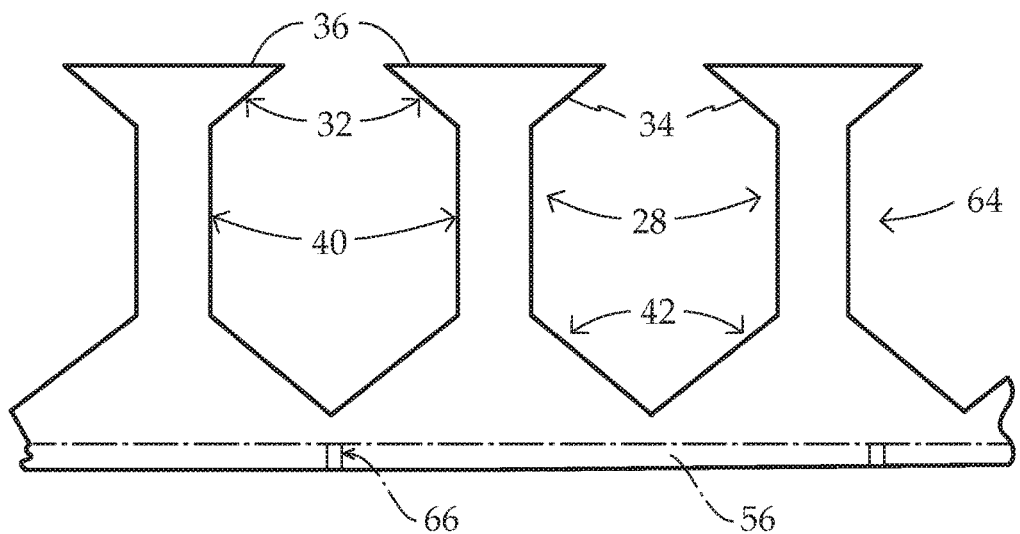
FIG. 7 is a schematic side elevational view of three columns in a matrix or manifold in an impact-absorbing layer of a helmet in accordance with the present invention.
Figure 10:
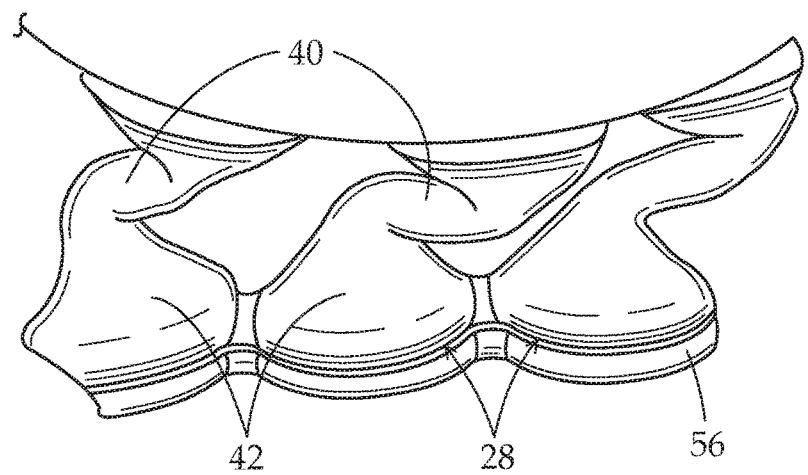
FIG. 10 is a perspective view of three buckled columns of a matrix or manifold in an impact-absorbing layer of a helmet in accordance with the present invention.

Three adjacent columns 28, attached together and to underlying sheet 56, are illustrated in FIG. 7. Since the radius C/2 of the top 36 of each capital section 32 is preferably less than the radius B/2 of the bottom of a base section 42, adjacent tops 36 typically do not touch one another. Typical manifolds 52 and 54, made with preferred dimensions, are shown in FIGS. 8 and 9. Several columns 28, extensively buckled under a large applied force, are shown in FIG. 10. These drawings display columns of equal size, but it is understood that the use of different sized columns in different locations within a helmet is a useful option.

There are a variety of suitable resilient materials out of which columns 28 can be fabricated. What is required is that the Young's Modulus E has a value such that the buckling threshold force F can be set to the desired value using appropriate values of the column dimensions (see FIG. 5). The material should also have suitably large thermal transmission coefficients. A preferred column material is silicone rubber. The available ranges in material properties are large (density 1.1-2.3 Mg/m$^3$, rupture stress 2.4-5.5 MPa, Young's modulus 0.001-0.05 GPa, specific heat 1050-1300 J/kg·K, thermal conductivity 0.2-2.55 W/kg·K), and silicone rubber is easily molded. Other possible material choices will be obvious to people skilled in the art.

Figure 11:
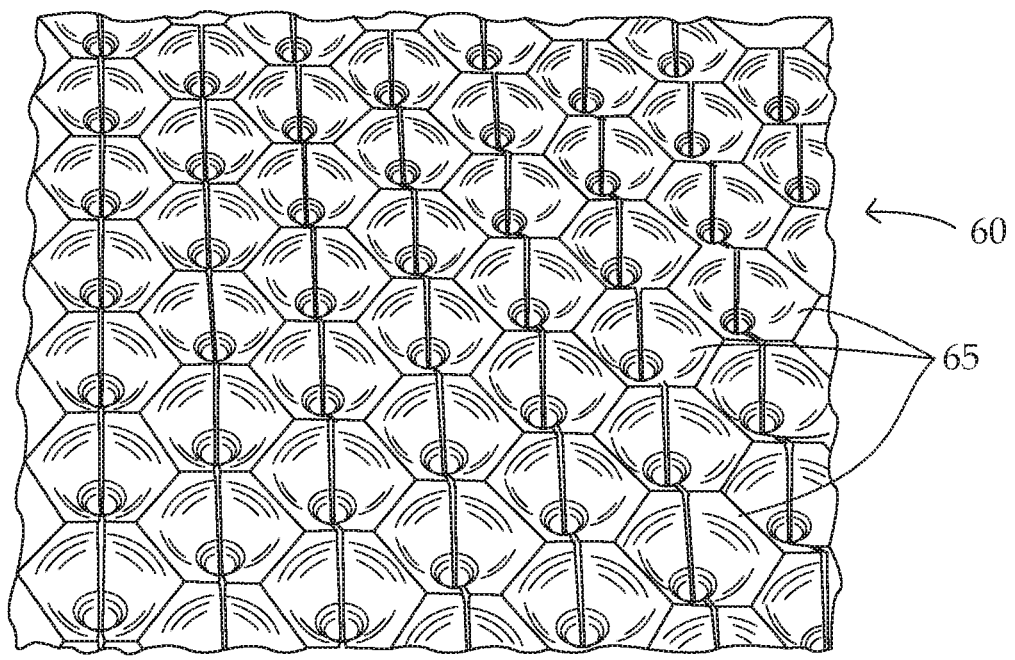
FIG. 11 is a partial perspective view of a mold for manufacturing a matrix or manifold for an impact-absorbing layer of a helmet in accordance with the present invention.
Figure 14:
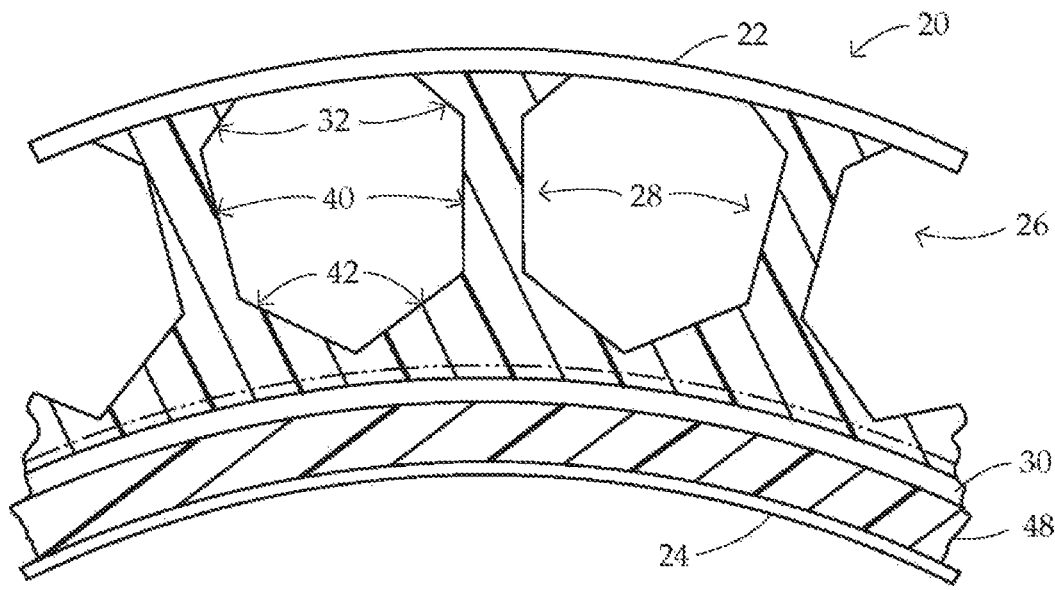
FIG. 14 is a partial cross-sectional view of a helmet in accordance with the present invention.
Figure 17:
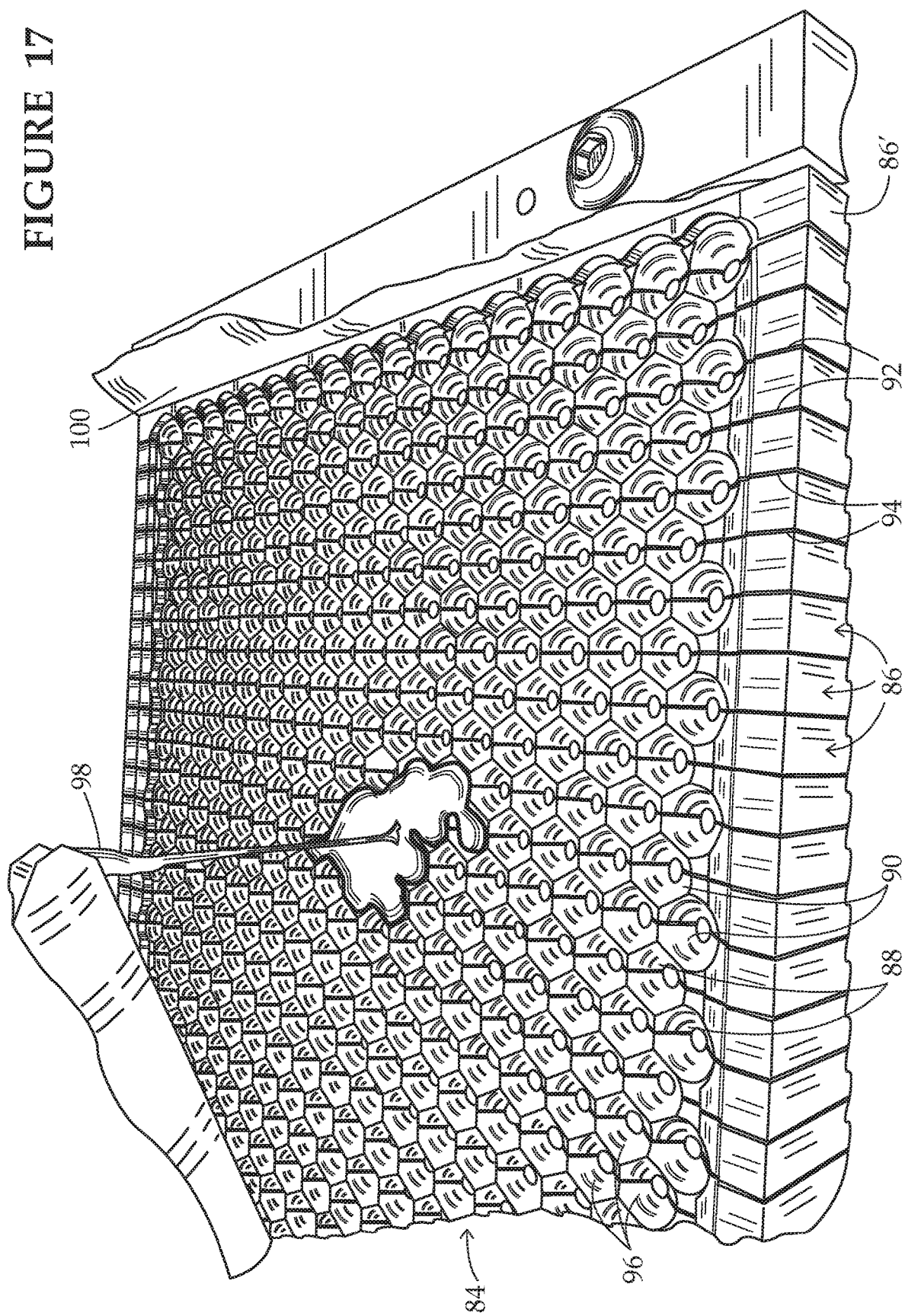
FIG. 17 is a perspective view of a mold for manufacturing a matrix or manifold for an impact-absorbing layer of a helmet in accordance with the present invention.

The column manifold 52, 54 is preferably fabricated in an inventive mold 60 (FIG. 11) or 62 (FIG. 17). The simplest possibility is to use a mold 60 with a flat bottom side that produces a manifold 64 (FIG. 7) with a similarly flat array of bottom sections 42. As depicted in FIG. 11, mold 60 consists of adjacent appropriate shaped holes 65 within an aluminum block. Mold 60 is designed to enable the removal of column manifold 64 after it is formed. In order to attach such a manifold 64 produced in mold 60 to the curved central shell 30, it is necessary to form suitable slits 66 in a lower or base sheet 56 of manifold 64. It is preferable to mold manifold 64 such that the lower sheet 5 is curved to match the curvature of the central or middle shell 30 (FIGS. 14 and 15).

Figure 12:
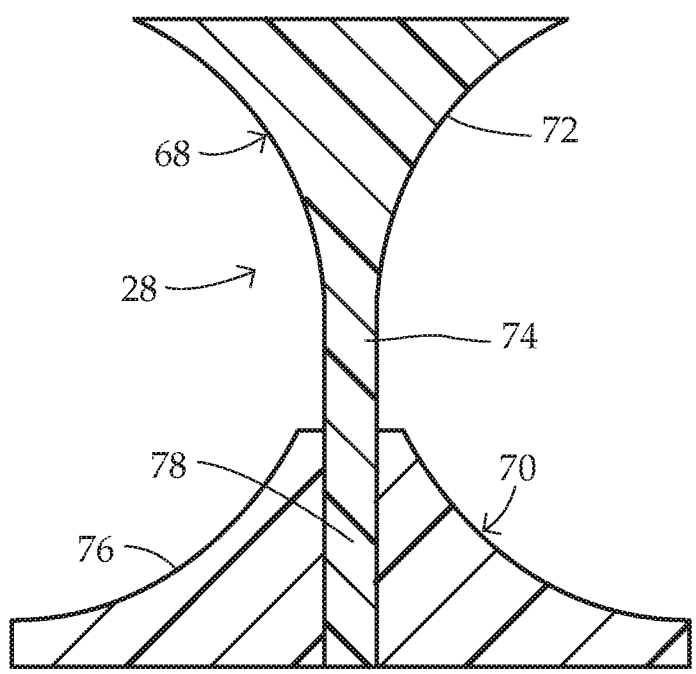
FIG. 12 is a schematic longitudinal cross-sectional view of a two-piece column for an impact-absorbing layer of a helmet in accordance with the present invention.

A preferred method to produce the desired curvature of the column base sections 42 is to assemble each column 28 by combining two separate parts 68 and 70, as shown in FIG. 12. Upper column part 68 consists of a capital section 72 and an attached shaft or post 74, while lower column part 70 consists of a base section 76 with a central vertical hole 78 that accommodates the inserted lower or free-end portion of the shaft or post 74. Each of these parts 68 and 70 is preferably fabricated by an injection molding process. The column manifold 52, 54, 64 can alternatively be made using robotic arms, or by using a heat vulcanization process. Other possible methods of manufacturing columns 28 and manifold 52, 54, 64 will be obvious to people skilled in the art.

Figure 13A:
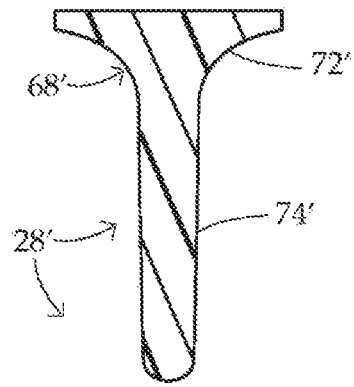
FIG. 13A is an exploded cross-sectional view of a two-piece column for an impact-absorbing layer of a helmet in accordance with the present invention, showing the two pieces before assembly or joining thereof.
Figure 13A:
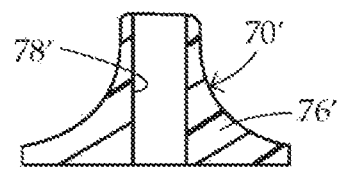
Figure 13B:
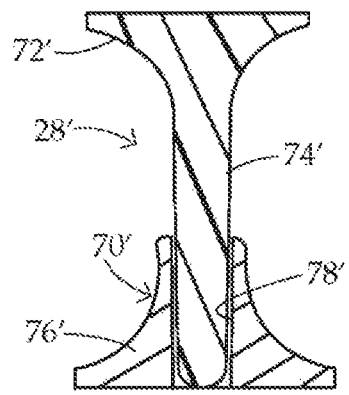
FIG. 13B a schematic longitudinal cross-sectional view of a two-piece column formed by joining the two pieces of FIG. 13A.

FIGS. 13A and 13B also depict a two-part column 28' formed by combining an upper column part 68' and a lower column part 20'. Upper part 68' includes a capital section 72' and an attached shaft or post 74', while lower column part 70' includes a base section 76' with a central vertical hole 78' that receives or seats a lower or free-end portion (not separately labeled) of the shaft or post 74'.

Although it is desirable to have all of the columns 28 combined in a single manifold for an entire helmet 20, as described above, there are other options. Individual columns 28 can be separately attached to the shells 22 and 30, or the columns 28 can be made in sections, such as several partial manifolds, that are separately attached to the shells. Whatever process is used for the fabrication, impact-absorbing columnar layer 26 will be disposed between outer shell 22 and central interior shell 30 as shown in FIG. 14 after attachment to those shells. FIG. 14 also depicts innermost interior shell 24 and layer 48 of relatively soft energy absorbent material between central shell 30 and innermost shell 24.

The material of layer 48, between the central shell 30 and innermost shell 24, should be relatively soft and flexible in order to provide for a comfortable fit on the head of a user. This material should, however, also contribute to the kinetic energy dissipation. The energy of the impacting body will have been diminished by the compressible outer shell 22 and, much more significantly, by the compression and buckling of the column manifold layer 26, but it is desirable to choose the flexible layer 48 so that it removes as much of the remaining kinetic energy as possible. Options include urethane foam and shock absorbing material such as sorbothane. Other material choices will be obvious to people skilled in the art.

A drawing of a complete preferred helmet design is shown in FIG. 15. An option is to incorporate a detachable lining 80 directly under the inner helmet shell 24. A preferred embodiment is illustrated in FIG. 16, where the displayed openings 82 are for ventilation. A preferred material for this lining is a syntactic anti-bacterial fiber. Other possibilities will be obvious to people skilled in the art.

In the manifold 64 of FIG. 7, the base sections 42 of at least some of the columns 28 are each unitary with the base section of at least one respective adjacent column. In other words at least some of the columns 28 are unitary with one another at their respective base sections 42. Thus the unitary or interconnected columns 28 form a matrix or manifold 64 between the outer shell 22 and the middle or central interior shell 30. This description also applies to the manifold or columnar 54 of FIG. 9.

In at least one configuration of columnar layer 26, the capital section 32 and base section 42 of each column 28 (FIGS. 1 and 5) include conical portions 34 and 44 each contiguous with the middle or pillar section 40. Capital section 32 is entirely conical, while base section 42 includes cylindrical portion 44 and conical portion 46.

The radial or diametric dimension of base 42 is preferably larger than the radial or diametric dimension of capital section 32, that is to say, columnar bases 42 are preferably larger than the capitals or crowns. For example, the capital section typically has a radius at least 3 times larger, and the base section has a radius that is at least 4.5 times larger, than a radius of the middle section, where the radii are measured in planes perpendicular to the axes of the columns.

For each column 28, it is contemplated that each of the three sections 32, 40, 42 has a circular cross-section in planes transverse or perpendicular to the axis 31 of the column.

In a method for manufacturing helmet 20, one provides outer shell 22 and at least one interior shell 30. The method comprises molding a plurality of deformable or collapsible columns 28, disposing the columns between the outer shell 20 and the interior shell 30 so that the columns are each oriented substantially perpendicularly to the outer shell and the interior shell, and attaching the columns to the outer shell and the at least one interior shell. The columns 28 are configured for deformation or collapse upon application of a force to the outer shell exceeding a predetermined maximum magnitude.

The molding of the columns 28 may include molding at least one subset of the columns together in a mold 60 (FIG. 11) having a mold base, thereby forming a manifold or matrix 52, 54, 64 of columns 28 in the subset. The manifold or matrix 52, 54, 64 has a molded base 56 with which the columns 28 of the subset of columns are unitary. Then the attaching of the columns 28 to the interior shell 30 includes attaching the molded base 56 to the interior shell. The molded base 56 may be a flat base or a concave spherical base whose curvature matches a curvature of the interior shell 30. If the molded base 56 is flat, it may be necessary to incorporate slits into said base in order for it to conform to the central helmet shell.

FIG. 17 shows another mold 84 for forming a columnar manifold or matrix 52, 54, 64. Mold 84 comprises a plurality of elongate mold pieces 86, each including a multiplicity of recesses 88 and 90 along opposing sides 92 and 94, each recess defining half of a respective mold cavity 96. (End mold pieces 86' only have one row of recesses 88 or 90, along one side 92 or 94.) Each mold cavity 96 receives liquid monomer or a mixture of polymer and monomer 98 that is poured over assembly mold 84. Mold cavities 96 form respective columns 28 of manifold or matrix, 52, 54, 64. A layer of the liquid composition atop the mold 84 hardens (polymerizes) to form manifold base layer 56. Mold pieces 86 may be held together in a container 100 or by another suitable compress or clamp (not shown). Upon completed hardening of the polymeric material, mold pieces 86 are removed from the container 98 and separated from one another to release the individual columns 28.

As indicated above, the manufacturing method may alternatively comprising molding upper parts 68, 68' and lower parts 70, 70' and inserting the shafts 74, 74' of the upper parts 68, 68' into holes or channels 78, 78' of the lower parts 70, 70' to thereby join the first parts 68, 68' to the second parts 70, 70'. The lower parts 70, 70' are attached to the upper or outer surface of interior shell 30, while the upper parts 68, 68' are attached to the lower or inside surface of outer shell 22.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A helmet comprising:
   an outer shell and at least one interior shell; and
   a plurality of columns disposed between said outer shell and said at least one interior shell,
   said columns being configured for deformation or collapse upon application of a force to said outer shell exceeding a predetermined maximum magnitude, wherein said columns each have a longitudinal axis and at least three sections including a middle section in a form of a post or pillar having a first dimension transverse to said axis, a capital section with a second dimension transverse to said axis, and a base section with a third dimension transverse to said axis, said second dimension and said third dimension each being substantially larger than said first dimension, said capital section being disposed against or in contact with said outer shell, said base section being disposed against or in contact with said at least one interior shell.

2. The helmet defined in claim 1 wherein said columns are each oriented substantially perpendicularly to said outer shell and said at least one interior shell.

3. The helmet defined in claim 1 wherein the base sections of at least some of said columns are unitary with the base sections of at least one respective adjacent column.

4. The helmet defined in claim 1 wherein said capital section and said base section each include conical portions each contiguous with said middle section.

5. A helmet comprising:
an outer shell and at least one interior shell; and
a plurality of columns disposed between said outer shell and said at least one interior shell,
said columns being configured for deformation or collapse upon application of a force to said outer shell exceeding a predetermined maximum magnitude,
wherein said at least one interior shell is one of a plurality of interior shells including an innermost interior shell, said at least one interior shell being disposed between said outer shell and said innermost interior shell.

6. The helmet defined in claim 5, further comprising a layer of resilient material between said at least one interior shell and said innermost interior shell.

7. The helmet defined in claim 5 wherein said innermost interior shell is constructed using a urethane or a leather fabric.

8. The helmet defined in claim 5 wherein said at least one interior shell is made of a substantially rigid material, said innermost interior shell being made of a resilient material.

9. The helmet defined in claim 5 wherein said outer shell is made of resiliently deformable material.

10. A helmet comprising:
an outer shell and at least one interior shell; and
a plurality of columns disposed between said outer shell and said at least one interior shell,
said columns being configured for deformation or collapse upon application of a force to said outer shell exceeding a predetermined maximum magnitude,
wherein each of said columns has central radius R, a height L, and a Young's Modulus E selected to satisfy a buckling condition whereby the columns deform and collapse upon application of a force to said outer shell exceeding said predetermined maximum magnitude.

11. The helmet defined in claim 10 wherein the buckling condition is given by the Euler expression for the minimum force F that causes buckling:

$$F=\pi^2 EI/(KL)^2=\pi^3 R^4 E/(2KL)^2,$$

where $I=\pi R^4/4$ is the minimum area moment of inertia of the column and $K=0.5$ for the relevant fixed boundary condition.

12. The helmet defined in claim 1, further comprising a base layer disposed proximate to said at least one interior shell, said columns being attached to or unitary with said base layer.

13. The helmet defined in claim 12 wherein said base layer is molded integrally with said columns.

14. The helmet defined in claim 1 wherein said outer shell includes multiple layers of synthetic aramid fiber material.

15. The helmet defined in claim 1 wherein said at least one interior shell is made at least in part of fiber reinforced plastic.

16. The helmet defined in claim 1 wherein said columns are attached separately from one another to said outer shell and said at least one interior shell.

17. The helmet defined in claim 1 wherein said columns are each attached at one end to said at least one interior shell and at an opposite end to said outer shell.

18. The helmet defined in claim 1 wherein the material comprising the columns is a silicone rubber.

19. A helmet comprising:
an outer shell and at least one interior shell; and
a plurality of columns disposed between said outer shell and said at least one interior shell,
said columns being configured for deformation or collapse upon application of a force to said outer shell exceeding a predetermined maximum magnitude,
wherein one or more of the columns each include a first part and a separate second part joined to one another, said first part consisting of a capital and an attached shaft, said second part consisting of a base with a central vertical hole or channel that accommodates or receives said attached shaft of said first part.

* * * * *